United States Patent Office 3,083,175
Patented Mar. 26, 1963

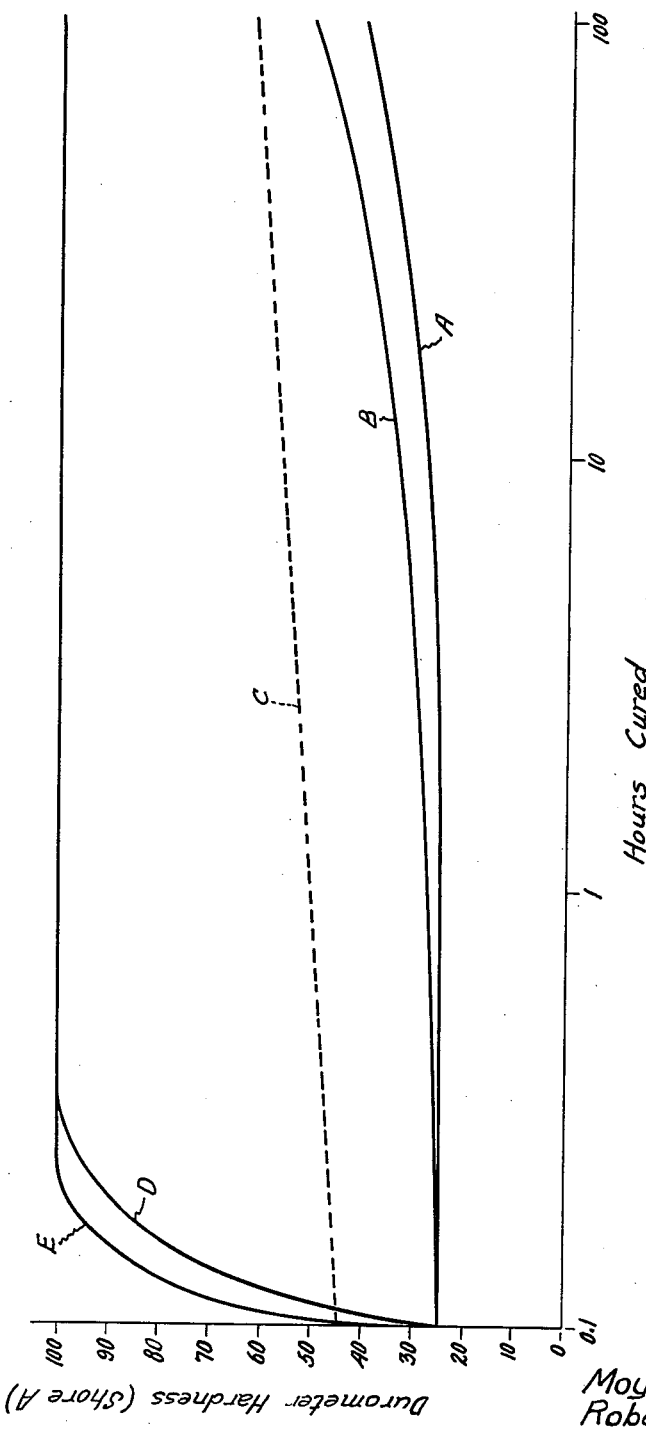

3,083,175
CURABLE COMPOSITION COMPRISING CURED FILLER, POLYMERIZED BUTADIENE AND DI-α-CUMYL PEROXIDE AND CURED PRODUCTS THEREOF
Moyer M. Safford, Schenectady, and Robert L. Myers, Ballston Lake, N.Y., assignors to General Electric Company, a corporation of New York
Filed Mar. 27, 1956, Ser. No. 574,332
2 Claims. (Cl. 260—45.5)

This invention relates to curable compositions comprising: (1) polymerized 1,3-butadiene (hereafter called "polybutadiene"), and (2) di-α-cumyl peroxide, and the cured products thereof. This invention also relates to a process which comprises curing polybutadiene with di-α-cumyl peroxide.

The feaures of this invention desired to be protected herein are pointed out with particularity in the appended claims. The invention itself may best be understood by reference to the following description taken in conjunction with the accompanying drawing.

In reference to the drawing, the FIGURE shown therein represents a comparison of the durometer hardness (Shore A) of both alkali metal polybutadiene (hereafter defined) and emulsion polybutadiene (hereafter defined) as a function of the time of cure with and without peroxides.

Heretofore, polybutadiene has been cured with sulfur to produce both soft and hard elastomers. However, sulfur-cured polybutadiene is unstable and decomposes at elevated temperatures. Attempts have been made to produce stable polybutadiene without using sulfur as a curing agent. Thus, U.S. Patent 1,901,044—Schmidt et al. describes a method of preparing hard polybutadiene free of sulfur by heating the polymer at high temperature for long periods of time such as at 250–300° C. or higher for about a day or longer in the absence of air.

In Coffman, "Industrial and Engineering Chemistry," 44, pp. 1421–1428 (1952), polybutadiene was treated with various peroxides, but even by using these peroxides, a long thermal hardening period of many days was required before a suitable hard product could be obtained.

We have now discovered that polybutadiene can be cured with di-α-cumyl peroxide within a very short period of time in the absence of sulfur to produce a heat stable polymer having good physical, chemical and electrical properties. It is quite surprising, and in no way could have been predicted, that di-α-cumyl peroxide would cure polybutadiene within such a short period of time, such as, for example, 15–30 minutes with as little as 1 percent of di-α-cumyl peroxide, since other peroxides do not produce comparable materials within the same period of time. The significance of the invention is that for the first time polybutadiene has been cured by a "short-cure" method attractive to commercial production to yield a hard, stable product.

The di-α-cumyl peroxide cured polybutadiene will hereafter be referred to as "cumyl-cured polybutadiene."

In general, the invention can be carried out by milling polybutadiene on differential rubber rolls (which can advantageously be heated if desired) as di-α-cumyl peroxide is added and intimately incorporated into the polymer. The rolled sheet is then pressed in a mold or other suitable curing device for a short period of time, for example 15–30 minutes at 150° C. The cumyl-cured poly-butadiene so produced has the characteristics of hard rubber and is superior to polybutadiene cured for the same period of time with other peroxides.

1,3-butadiene can enter into a polymer chain by either a 1,2- or 1,4-mode of addition; the 1,2-mode of addition results in the following "dangling vinyl" structure

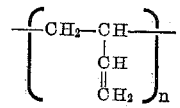

(hereafter called "1,2-polybutadiene") whereas the 1,4 mode of addition results in the following structure:

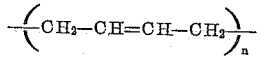

(hereafter called "1,4-polybutadiene"). Two types of catalysts are generally used to polymerize 1,3-butadiene, namely the free-radical and the alkali metal type catalysts. When 1,3-butadiene is polymerized by free-radical type catalysts such as peroxides, persulfates, etc. in an aqueous emulsion system, a higher proportion of 1,4-polybutadiene results as compared to the product produced by the alkali metal type catalyst where a higher proportion of 1,2-polybutadiene is obtained. Using free-radical catalysts one obtains polybutadiene having less than 25% 1,2-polybutadiene.

Although both free-radical polymerized butadiene (also called "emulsion polybutadiene") and alkali metal polymerized butadiene (also called "alkali metal polybutadiene") can be cured with di-α-cumyl peroxide, the alkali metal polybutadiene can be cured to a much harder product within a surprisingly shorter period of time than that required for emulsion polybutadiene. This may be due to the fact that alkali metal polymerized butadiene which contains larger amounts of "dangling vinyl group" (1,2-polybutadiene) cures more readily with di-α-cumyl peroxide to produce a harder polymer than the free radical cured butadiene which has its residual double bonds "buried" in the chain of the 1,4-polybutadiene. In order to cure polybutadiene to a very hard polymer within a short period of time, it is necessary to use polybutadiene having a high percentage of the 1,2-type; i.e. over 30% and preferably 50–100% 1,2-polybutadiene.

Among the alkali metal type catalysts which have been used to produce polybutadiene having high percentages of 1,2-polybutadiene are alkali metals and compounds containing alkali metals. Thus, metals such as lithium, sodium, potassium, rubidium, cesium, sodium-potassium alloys, and compounds of these metals such as phenyl isopropyl potassium, triphenyl methyl sodium, lithium butyl, amyl sodium and the like compounds have been used to effect such polymerization.

Where as free radical catalysts tend to produce larger amounts of 1,4-polybutadiene, catalysts of the alkali metal type tend to increase the ratio of the 1,2-polybutadiene. However, temperature as well as catalysts affect the type of polymer formed; for example, polybutadiene produced by polymerizing 1,3-butadiene with sodium at 110° C. contains about 15% of the 1,2-polybutadiene whereas 100% of 1,2-type polymer is produced when 1,3-butadiene is polymerized with sodium at −70° C. Although the ratio of the 1,2- to the 1,4-polybutadiene can be determined by ozonization, probably the more accurate method of determining this ratio is by the use of infra-red spectra.

Infra-red curves identifying the different types of polymers are found in Dogadkin et al., "Rubber Chemistry and Technology," 24, pp. 591–596 (1951), Hampton, "Anal. Chem." 21, pp. 923–926 (1949); and Meyer, "Ind. Eng. Chem." 41, pp. 1570–1577 (1949). An excellent description of polybutadiene polymers is found in Whitby, "Synthetic Rubber," pp. 734–757, Wiley and Sons, N.Y. (1954), wherein are described methods of preparing polybutadiene falling within the scope of this invention.

Since molecular weight is related to viscosity, viscosity measurements are a convenient method of expressing the molecular weight. Although polybutadiene gums of a broad intrinsic viscosity range can be employed, we advantageously have employed polybutadiene having an intrinsic viscosity of about 1.0 to 8.0 or higher. Optimum properties are obtained using polybutadiene having an intrinsic viscosity of 3.0 to 6.0.

Inherent viscosity is determined by a viscometer such as an Ostwald viscometer on a 0.25 percent solution of polybutadiene in benzene. This value is calculated as the natural logarithm of the ratio of flow time of the solution to the flow time of the solvent divided by the concentration in grams/100 ml. Intrinsic viscosity $[\eta]$ is obtained by extrapolating the inherent viscosity vs. concentration curve to zero concentration.

The above described polybutadiene can be cured to products of this invention with di-α-cumyl peroxide,

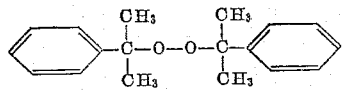

which peroxide can be prepared in the manner described in Karasch et al., "Journal of Organic Chemistry," 15, pp. 753–762 (1950). The proportion of this unique peroxide to polybutadiene can be varied over wide limits depending on the characteristics desired in the final product. Preferably, we employ the peroxide in amounts ranging from .1 to 10 percent or higher, based on weight of polymer. Optimum properties and curing time are obtained with about from 1 to 4 percent of peroxide based on weight of polymer.

In order that those skilled in the art may better understand how the present invention may be practiced, the following examples are given by way of illustration and not by way of limitation. All parts are by weight.

EXAMPLE 1

A rubbery polymer was prepared from 1,3-butadiene and finely divided sodium using the technique described in Marvel et al., "J. Polymer Science I," p. 275 (1946). The following procedure was employed: Into a clean, dry bottle was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped, and rotated at 30° C. for a period of 48 hours. The residual catalyst was deactivated by adding 50 ml. of a 10% solution of absolute ethyl alcohol in benzene. The rubber was recovered by precipitation from a benzene solution by addition of ethyl alcohol until polymer no longer precipitated. To this precipitated product was added 0.1% of phenyl-β-napthylamine as an antioxidant, based on weight of polymer. This unwashed polymer had an intrinsic viscosity of 6.0 when measured in benzene solution. By infra-red analysis this product contained at least 60% of 1,2-polybutadiene.

The polybutadiene prepared in Example 1 was milled on differential rubber rolls as 3% of various peroxides (based on weight of polybutadiene) were added thereto. The rolled sheets were then pressed in a mold for 30 minutes at 150° C. Thereupon the product was tested for tensile strength, percent elongation (both measured by ASTM procedure D–638–46T). The durometer hardness (Shore A) was determined by a pointer forced into the test specimen. A scale from 0–100 units indicates the hardness, higher readings indicating harder products (ASTM D–676–47T). The results are given in Table I.

Table I

| Ex. | Peroxide | Tensile Strength (p.s.i.) | Percent Elongation | Durometer |
|---|---|---|---|---|
| 2 | Di-α-cumyl peroxide | 636 | 100 | 95 |
| 3 | Tert-butyl perbenzoate | 62 | 100 | 45 |
| 4 | Di-tert-butyl peroxide | 280 | 100 | 55 |
| 5 | Benzoyl peroxide | 77 | 1,200 | (¹) |

¹ Only slight cure; porous.

From this table it is evident that cumyl-cured polybutadiene subjected to a "short cure" is superior to polybutadiene cured with other peroxides. When the cured product prepared in the manner of Example 2 was heat aged in air at 200° C. for 500 hours, it darkened slightly. This same sample was then further heat aged in air at 300° C. for 500 hours, and although the surface was crazed and blackened, the material was not electrically conducting; the resin below the surface was still in good condition. By avoiding contact with air, it is possible to avoid charring even at these or higher temperatures. It is quite unexpected that a hydrocarbon material would be so heat stable at these high temperatures.

Another advantage of the di-α-cumyl peroxide over other peroxides is that it can be milled into the polybutadiene gum at elevated temperature such as at 130° C., at which temperature the other peroxides prematurely decompose. This higher temperature milling insures more homogeneous mixing particularly when the polybutadiene gum is very stiff. In addition, because of heat stability of the peroxide, uncured polybutadiene-di-α-cumyl peroxide compositions can be shipped in commerce without deleterious effects.

Polymer-peroxide compositions which are stable during the forming operations, such as calendering, extrusion, etc. are particularly desirable because ease of processing of polymers is of extreme importance in commercial operations. For example, it is essential that polymers be capable of being extruded at high speeds in a continuous curing operation. The composition, therefore, should flow easily, have a smooth surface, and a minimum of nerve. Thus, plasticity is very important, particularly in the wire industry. Since gums are more plastic at elevated than at lower temperatures, it is highly desirable to have a gum-peroxide composition that can be extruded at elevated temperature at a fast rate without prematurely curing. Thus, polybutadiene-di-α-cumyl peroxide compositions can be extruded at those temperatures at which other peroxides would prematurely decompose.

In addition to possessing the physical properties described above, the electrical properties of cumyl-cured polybutadiene prepared in the manner of Example 2 were tested. A part of the uncured polybutadiene prepared in the manner of Example 1 was washed with water on differential rolls before curing while another sample of the same material was not washed. Where the sodium-type catalyst is deactivated with water or alcohols and the products are allowed to remain in the polymer, the product is called "unwashed." Where the deactivated catalyst is removed by washing with water, the product is called "washed." The results are given in Table II.

Table II

| Polybutadiene | T° C. | P.F. | $\epsilon'$ | $\epsilon''$ | AC ρ | DC ρ |
|---|---|---|---|---|---|---|
| Unwashed | 25.5 | 0.002 | 2.6 | 0.005 | 1×10¹³ | 3×10¹³ |
| Unwashed | 90.0 | 0.002 | 2.5 | 0.004 | 8×10¹² | 3×10¹³ |
| Washed | 25.5 | 0.001 | 2.4 | 0.003 | 9×10¹² | 7×10¹³ |
| Washed | 90.0 | 0.001 | 2.4 | 0.003 | 1×10¹³ | 7×10¹³ |

It is of interest to note that although most insulating materials exhibit increased losses as the temperature rises, both washed and unwashed cumyl-cured polybutadiene exhibit a uniformity of losses at both room and at elevated temperatures.

The tests used in Table II were carried out according to the following ASTM measurements: power factor (P.F.) D–150–47T, dielectric constant ($\epsilon'$) D–150–47T, loss factor ($\epsilon''$) D–150–47T, alternating current resistivity ($AC_\rho$) D–257–46, and direct current resistivity ($DC_\rho$) D–257–46.

EXAMPLE 6

Emulsion polybutadiene was prepared by adding 25 parts of liquid 1,3-butadiene to a chilled solution of 1.25 parts of soap flakes (Ivory Flakes), 0.3 part of potassium persulfate, and 0.5 part of dodecyl mercaptan in 45 parts of water. The reaction vessel was rotated continuously at 50° C. for 48 hours, then cooled to the temperature of ice-water, vented, and the contents added with stirring to a concentrated aqueous solution (at 0° C.) of sodium chloride. Thereupon 200 cc. of a 2% $H_2SO_4$ solution was added to the slurry. After the product was freed of acid and salts by water washings, water was removed by washing with alcohol and placing the resulting product in a desiccator for 48 hours to remove the residual alcohol. An antioxidant (phenyl-$\beta$-naphthylamine 0.1% based on polymer) was then milled into the product.

In addition to the method described in Example 6, emulsion polymerized polybutadiene can be prepared by other methods known to the art as for example those methods disclosed in Whitby, "Synthetic Rubber," John Wiley & Sons (1954), pp. 699–701.

The durometer hardness (Shore A) of both alkali metal polybutadiene and emulsion polybutadiene cured by various methods were compared. These results are shown in the drawing wherein durometer hardness is plotted against time of cure (on a logarithmic scale). The unbroken line curves refer to sodium polybutadiene, while the broken line curve refers to emulsion polybutadiene. Curve A represents sodium polybutadiene (prepared by the method of Example 1) cured without peroxides at 150° C.; curve B represents sodium polybutadiene (prepared by the method of Example 1) cured without peroxides at 200° C.; curve C represents emulsion polybutadiene (prepared according to the method of Example 6) containing 1% di-$\alpha$-cumyl peroxide, based on weight of polymer, cured at 150° C.; curve D represents sodium polybutadiene containing 1% di-$\alpha$-cumyl peroxide cured at 150° C.; and curve E represents the same composition as curve D at 170° C. From this graph it is evident that the cure without peroxides is extremely slow; that emulsion polybutadiene does not cure to a very hard product as readily as does the alkali metal polymer; and that with di-$\alpha$-cumyl peroxide a faster cure is effected at 170° C. than at 150° C.

A problem which is encountered in curing polybutadiene is that of shrinkage. Thus, when polybutadiene is cured with either heat or peroxides, a shrinkage of over 4% is noted. Although this does not affect many uses to which polybutadiene is applied, it is somewhat objectionable in molding applications.

We have found that this defect can be corrected by incorporating organic or inorganic fillers into the polybutadiene-di-$\alpha$-cumyl peroxide composition and curing the filled product. In addition, these cured filled products are less brittle than the cured, unfilled polymer.

Among the fillers that can be employed are various types of carbon blacks, silicas, aluminas, and calcium silicate as disclosed in application Serial No. 509,387—Precopio et al., filed May 18, 1955, and assigned to the same assignee as the present application; silicas rendered hydrophobic by surface treatment with: (1) alcohols in the manner described in U.S. Patent 2,657,149—Iler, and (2) with trialkylsilanes in the manner of Bueche et al., application Serial No. 531,829, filed August 31, 1955, and assigned to the same assignee as the present invention. Other fillers can also be used, such as, for example, titanium dioxide, zinc sulfide, calcium carbonate, zinc oxide, magnesia, clays, etc.

In addition to inorganic fillers, such as those described above, organic fillers can also be used. Organic fillers have the advantage as they are capable of reducing shrinkage and brittleness without appreciably affecting electrical properties. Among organic fillers are: coumarone-indene resins, petroleum resins, polyterpene resins (such as those described in "Modern Plastic Encyclopedia," 1955, pp. 82–84), high styrene resins, such as high styrene-low butadiene copolymers, lignins, wood flour, styrene-isobutylene resins, phenolic resins, etc.

We have unexpectedly found that if cumyl-cured polybutadiene is ground into a fine powder and then compounded as a filler in uncured polybutadiene, and subsequently cured with di-$\alpha$-cumyl peroxide, shrinkage was reduced to less than ½% without harming the physical or electrical properties as will be shown in the following example.

EXAMPLE 7

Cumyl-cured polybutadiene prepared by the method of Example 2 was finely ground. Forty parts of this powder were incorporated into 100 parts of polybutadiene prepared in Example 1 and milled on differential rubber rolls as 3% of di-$\alpha$-cumyl peroxide was added. The rolled sheet was then pressed in a mold for 30 minutes at 150° C. When the cured product was removed from the mold, it was noted that less than ½% shrinkage had occurred. The physical and electrical properties were compared to cured polybutadiene prepared in the manner of Example 2 and found to be substantially identical.

EXAMPLE 8

Forty parts of wood flour were milled into 100 parts of the polybutadiene prepared in Example 1 as 3% of di-$\alpha$-cumyl peroxide was added. The rolled sheets were then pressed in a mold for 30 minutes at 150° C. When the cured product was removed from the mold, it was noted that less than ½% shrinkage had occurred. This product was also less brittle than polybutadiene prepared by the method of Example 2.

By using di-$\alpha$-cumyl peroxide, polybutadiene can be cured within a short time to a heat stable material possessing good chemical, physical, and electrical properties. The product is insoluble in the common solvents and is very hard. It is surprisingly inert to most chemical agents and does not soften or decompose at very high temperatures. Since its electrical conductivity is very low, it makes an excellent insulating material. Because it can be prepared as a colorless, transparent or translucent material, it has excellent eye appeal.

Polybutadiene can be used to prepare molded, calendered or extruded articles, films, coatings, threads, or filaments, tapes and the like. The cumyl-cured molded, calendered or extruded articles possess extreme hardness yet possess sufficient elasticity to be applied to a broad spectrum of uses, such as sheets, rods, tubes, etc. useful in electrical applications, such as cable terminals, terminal blocks, backing for electrical circuits, as components of dynamoelectric machines that operate at high temperature, etc. Films of this material can be prepared by dissolving or suspending the uncured polybutadiene-peroxide composition in a suitable solvent, such as cyclohexane, chlorinated solvents, such as methylene chloride, etc. followed by spreading and curing on a surface from which the polymer can be removed after drying. As a coating material, the uncured polybutadiene-peroxide composition can be applied as a solution or suspension to any convenient foundation where a hard, durable, scratch resistant surface is desired, and subsequently cured. It can be used as an encapsulation material for insulation, for example, as a wire enamel, etc. In a solution or suspension the uncured composition can be extruded into air which has been heated to sufficiently high temperature to cure the polymer and to drive off the solvent. The fibers so produced can be woven in fabrics that can be used as filter cloths where high chemical and heat resistance is desired.

Cumyl-cured polybutadiene can also be used in many everyday articles where extreme hardness is needed, for example, as doorknobs, cigarette holders, buttons, pen holders, combs, casings for portable radios and television receivers, and other articles which are subjected to hard use.

The products of this invention can also be used as laminates, i.e. products made by bonding together two or more layers of materials. These laminates may contain filler materials, such as ground quartz, etc. and may be prepared by impregnating a material, such as paper, glass, cloth, sheets of metal, other resins, etc. Because of their superior properties, laminates of polybutadiene can be used as table or counter tops, sink tops, work benches, wall panels, baseboards, wainscoating, elevator linings, and many other applications which require hard, durable materials, such as the interior finishing of public places, for example, the interior parts of hotels, passenger transportation equipment, etc. Its excellent electrical properties make laminates of this material useful for electrical equipment, such as slot wedges in the armature of an electric motor, panel boards for printed circuits, electrical appliance panels, radio and television panels, small punched electrical pieces, transformer terminal boards, switchboard panels, transformer coil spacers, etc.

Polybutadiene can also be compounded with an abrasive material (such as sand, Carborundum, alumina, tungsten carbide, diamond dust, and other abrasive materials) and cured with di-α-cumyl peroxide according to this invention. Polybutadiene acts as an excellent binder for abrasives since it is tough, adhesive, resistant to heat, etc. Abrasive wheels can be prepared by sandwiching polybutadiene loaded with abrasive between glass cloth, pressing, and curing. In preparing abrasive materials (although the amount of polybutadiene will vary with the particular abrasive), it is advantageous to use as little polybutadiene as possible consistent with proper binding of the abrasive, i.e. 50% or more of the abrasive material based on total weight.

EXAMPLE 9

Blocks of abrasive materials are prepared by milling 10 parts of polybutadiene (prepared by the method of Example 1), 0.3 part of di-α-cumyl peroxide and 60 parts of the following abrasives: (1) Carborundum, (2) alumina, (3) tungsten carbide, (4) sand, and curing the milled material. Hard, cohesive blocks of abrasive materials are produced which are capable of sharpening implements, such as knives, etc.

In addition, the compositions of this invention can be used as potting gels for electrical insulation, for example, in motors, transformers, etc. In general these potting gels are prepared by (1) dissolving polybutadiene in a liquid potting medium of good electrical properties such as hydrocarbon oils, low molecular weight polyisobutylene, organic polyesters, etc., (2) adding dicumyl peroxide thereto, (3) pouring this composition into the area to be insulated, (4) heating so as to gel this composition.

The electrical insulating properties of these potting gels are excellent. Dicumyl peroxide is an excellent peroxide to use as a curing agent since unlike most peroxides it gives off no acids on decomposing. Although the amount of polybutadiene and dicumyl peroxide in the potting composition can be varied within wide limits, we have advantageously employed 5–15% of polybutadiene, and from 1–5% of dicumyl peroxide, based on total composition.

EXAMPLE 10

A potting gel was prepared by dissolving 10 parts of sodium polybutadiene (Example 1) in 90 parts of a highly refined hydrocarbon oil used in transformers (viscosity 10 centistokes) by heating the mixture to 125° C. This composition was then cooled to about 100° C. and 1 part of dicumyl peroxide was added thereto. This composition was then poured into the section of a motor to be electrically insulated, where it was cured by heating for 30 hours at about 150–160° C. The product, a soft gel, exhibited excellent electrical properties.

Firmer gels were prepared by varying the amount of dicumyl peroxide. For example, we repeated the above procedure except that 2 and 4% of dicumyl peroxide was employed in place of 1% peroxide to produce a firmer gel.

The hardness of the product can be varied by using varying amounts of peroxide. It is often desirable to add antioxidants, for example, phenyl-β-naphthyl amine, the reaction product of diphenyl amine and acetone, triphenyl phosphite, di-tert-butylhydroquinone, alkylated phenols and the like to the product. When antioxidants are used, larger amounts of peroxide are generally required to effect a satisfactory cure. In addition, plasticizers, e.g. hydrocarbons, metal salts of fatty acids, aliphatic and aromatic esters, polyorganosiloxane oils and gums, etc. can also be incorporated into the curable mixture. By varying the kinds of these auxiliary materials, it is possible to vary the properties of the product within wide limits. Dyes, pigments, and the like can also be added to produce a resin in the desired color.

What we claim as new and desire to secure by Letters Patent of the United States is:

1. A curable composition which exhibits little shrinkage on curing, which comprises (1) a filler which is finely ground, cured, alkali metal polymerized 1,3-butadiene wherein the polymerized 1,3-butadiene comprises at least 30% 1,2-polybutadiene, said finely ground filler being cured with di-α-cumyl peroxide, (2) alkali metal polymerized 1,3-butadiene comprising at least 30% 1,2-polybutadiene, and (3) 0.1–10% di-α-cumyl peroxide based on the weight of the polymerized 1,3-butadiene.

2. The cured product of claim 1.

References Cited in the file of this patent

UNITED STATES PATENTS

| | | |
|---|---|---|
| 2,422,153 | Van Nimwegen et al. | June 10, 1947 |
| 2,558,527 | Rumscheidt et al. | June 26, 1951 |
| 2,676,944 | Doak | Apr. 27, 1954 |
| 2,690,461 | Steeves | Sept. 28, 1954 |
| 2,819,255 | Boardman | Jan. 7, 1958 |
| 2,819,256 | Boardman | Jan. 7, 1958 |
| 2,835,642 | Safford et al. | May 20, 1958 |

OTHER REFERENCES

Warden: "India Rubber World," volume III of 1944, pages 309 to 311, 260–773.

Whitby: "Synthetic Rubber," published by John Wiley and Sons, New York 1954, pages 734 to 757.

Chemical and Engineering News, vol. 33, No. 20, page 2079, May 16, 1955.

Braden et al.: "Transactions of the Institution of the Rubber Industry," volume 31, No. 6, part II, December 1955, pages 155 to 165.